United States Patent
Simcik et al.

(10) Patent No.: US 10,157,512 B2
(45) Date of Patent: Dec. 18, 2018

(54) GROUP ACCESS MANAGEMENT FOR VISITOR CONTROL

(71) Applicant: Otis Elevator Company, Farmington, CT (US)

(72) Inventors: Paul A. Simcik, Southington, CT (US); Emily Baldi, East Hartford, CT (US); Kelly Martin Dubois, Unionville, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 0 days.

(21) Appl. No.: 15/475,618

(22) Filed: Mar. 31, 2017

(65) Prior Publication Data

US 2018/0286157 A1 Oct. 4, 2018

(51) Int. Cl.
 *G07C 9/00* (2006.01)
 *G05B 15/02* (2006.01)

(52) U.S. Cl.
 CPC ......... *G07C 9/00103* (2013.01); *G05B 15/02* (2013.01); *G07C 9/00309* (2013.01); *G07C 9/00571* (2013.01); *G07C 2009/00769* (2013.01); *G07C 2209/63* (2013.01)

(58) Field of Classification Search
 CPC ............ G07C 9/00103; G07C 9/00111; G07C 9/00309; G05B 15/02
 See application file for complete search history.

(56) References Cited

U.S. PATENT DOCUMENTS

| 7,030,765 | B2 | 4/2006 | Giraldin et al. |
| 8,872,915 | B1* | 10/2014 | Scalisi .................. H04N 7/186 348/140 |
| 8,902,042 | B2 | 12/2014 | Davis et al. |
| 9,202,322 | B2 | 12/2015 | Kappeler et al. |
| 9,210,378 | B2 | 12/2015 | Leske et al. |
| 9,269,207 | B2 | 2/2016 | Fyke et al. |

(Continued)

FOREIGN PATENT DOCUMENTS

| WO | 2015199609 A1 | 12/2015 |
| WO | 2016087478 A1 | 6/2016 |
| WO | 2016137547 A1 | 9/2016 |

OTHER PUBLICATIONS

Soleimani, Mohammad, "How a Standard Interface Enhances Visitor Management and Physical Access Control System Intergrations", PSIA, http://security.kastle.com/wp-content/uploads/2016/09/visitor-management-white-paper.pdf, Sep. 13, 2016, 6pgs.

(Continued)

*Primary Examiner* — Leon Flores
(74) *Attorney, Agent, or Firm* — Cantor Colburn LLP

(57) ABSTRACT

A method of controlling access to a building is provided. The method comprising: receiving a visitor access request for a visitor mobile device; determining a residential group assigned to the visitor mobile device, the residential group including at least one residential mobile device; transmitting the visitor access request to at least one of a resident mobile device within the residential group and a manager device; receiving an access grant from at least one of the resident mobile device within the residential group and the manager device; and granting a visitor mobile device access to at least one of a selected elevator car, a selected door, and a selected floor.

18 Claims, 3 Drawing Sheets

(56) References Cited

U.S. PATENT DOCUMENTS

| | | |
|---|---|---|
| 9,368,023 B2 | 6/2016 | Cobb et al. |
| 9,425,981 B2 | 8/2016 | Foster |
| 2013/0031611 A1 | 1/2013 | Barreto |
| 2013/0200994 A1 | 8/2013 | Kannan |
| 2013/0298043 A1 | 11/2013 | Bailey |
| 2015/0194000 A1* | 7/2015 | Schoenfelder ..... G07C 9/00309 340/5.61 |
| 2015/0341336 A1 | 11/2015 | Trell |
| 2016/0125676 A1* | 5/2016 | Pouille ............... G07C 9/00031 340/5.7 |
| 2016/0284139 A1 | 9/2016 | Klein et al. |
| 2017/0034689 A1 | 2/2017 | Lee et al. |

OTHER PUBLICATIONS

EP Extended European Search Report for Application No. 18164908.8-1009; dated Aug. 21, 2018; dated Aug. 30, 2018; 1-12 pages.

\* cited by examiner

GROUP ACCESS MANAGEMENT FOR VISITOR CONTROL

BACKGROUND

The subject matter disclosed herein generally relates to the field of building access controls, and more particularly to an apparatus and method for controlling access to elevators, floors, and/or doors within a building.

Existing building access controls require a building supervisor to control users' access to building doors, floors and/or elevators. Residents may invite visitors to the building but when the visitor arrives they may not be able to gain access to the building.

BRIEF SUMMARY

According to one embodiment, a method of controlling access to a building is provided. The method comprising: receiving a visitor access request for a visitor mobile device; determining a residential group assigned to the visitor mobile device, the residential group including at least one residential mobile device; transmitting the visitor access request to at least one of a resident mobile device within the residential group and a manager device; receiving an access grant from at least one of the resident mobile device within the residential group and the manager device; and granting a visitor mobile device access to at least one of a selected elevator car, a selected door, and a selected floor.

In addition to one or more of the features described above, or as an alternative, further embodiments of the method may include where the visitor request is transmitted to the resident mobile device; and the access grant is received from the resident mobile device.

In addition to one or more of the features described above, or as an alternative, further embodiments of the method may include creating a residential group using at least one of the resident mobile device, the manager device, and the manager device.

In addition to one or more of the features described above, or as an alternative, further embodiments of the method may include creating a residential group in response to a location of the resident mobile device.

In addition to one or more of the features described above, or as an alternative, further embodiments of the method may include where the location is within the building.

In addition to one or more of the features described above, or as an alternative, further embodiments of the method may include where the location is a projected location at a selected time.

In addition to one or more of the features described above, or as an alternative, further embodiments of the method may include where the location is within a selected radius of the visitor mobile device.

In addition to one or more of the features described above, or as an alternative, further embodiments of the method may include where the location is within a selected radius of a selected destination of the visitor mobile device.

In addition to one or more of the features described above, or as an alternative, further embodiments of the method may include where the visitor request is received from at least one of the resident mobile device and the visitor mobile device.

In addition to one or more of the features described above, or as an alternative, further embodiments of the method may include where the visitor access request is transmitted only to resident mobile devices located in the building.

In addition to one or more of the features described above, or as an alternative, further embodiments of the method may include: detecting when the visitor mobile device is located proximate to at least one of a selected elevator car, a selected door, and a selected floor.

In addition to one or more of the features described above, or as an alternative, further embodiments of the method may include transmitting the visitor access request to at least one resident mobile device within the residential group when the visitor mobile device is located proximate at least one of a selected elevator car, a selected door, and a selected floor.

In addition to one or more of the features described above, or as an alternative, further embodiments of the method may include transmitting a notification to the visitor mobile device when access is granted.

In addition to one or more of the features described above, or as an alternative, further embodiments of the method may include where the granting further comprises: unlocking the selected door when the visitor mobile device is presented to the selected door.

In addition to one or more of the features described above, or as an alternative, further embodiments of the method may include where the granting further comprises: opening the selected elevator car when the visitor mobile device is presented to the selected elevator car.

In addition to one or more of the features described above, or as an alternative, further embodiments of the method may include where the granting further comprises: moving the selected elevator car to the selected floor when the visitor mobile device is presented to the selected elevator car.

In addition to one or more of the features described above, or as an alternative, further embodiments of the method may include: transmitting the visitor access request to the manager device; receiving an access denial from the manager device; and denying the visitor mobile device access to at least one of a selected elevator car, a selected door, and a selected floor; wherein denying access overrides any granting access to a selected elevator car, a selected door, and a selected floor.

In addition to one or more of the features described above, or as an alternative, further embodiments of the method may include prior to granting: transmitting the visitor access request to the manager device; and receiving an access approval from the manager device.

According to another embodiment, a building system is provided. The building access system comprising: a processor; a memory comprising computer-executable instructions that, when executed by the processor, cause the processor to perform operations. The operations comprising: receiving a visitor access request for a visitor mobile device; determining a residential group assigned to the visitor mobile device, the residential group including at least one residential mobile device; transmitting the visitor access request to at least one of a resident mobile device within the residential group and a manager device; receiving an access grant from at least one of the resident mobile device within the residential group and the manager device; and granting a visitor mobile device access to at least one of a selected elevator car, a selected door, and a selected floor.

According to another embodiment, a computer program product tangibly embodied on a computer readable medium is provided. The computer program product including instructions that, when executed by a processor, cause the processor to perform operations comprising: receiving a visitor access request for a visitor mobile device; determining a residential group assigned to the visitor mobile device, the residential group including at least one residential mobile device; transmitting the visitor access request to at least one of a resident mobile device within the residential group and a manager device; receiving an access grant from at least one of the resident mobile device within the residential group and the manager device; and granting a visitor mobile device access to at least one of a selected elevator car, a selected door, and a selected floor.

Technical effects of embodiments of the present disclosure include the ability for a group of residents to grant a visitor access to a building door, floor, and/or an elevator through a user interface.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
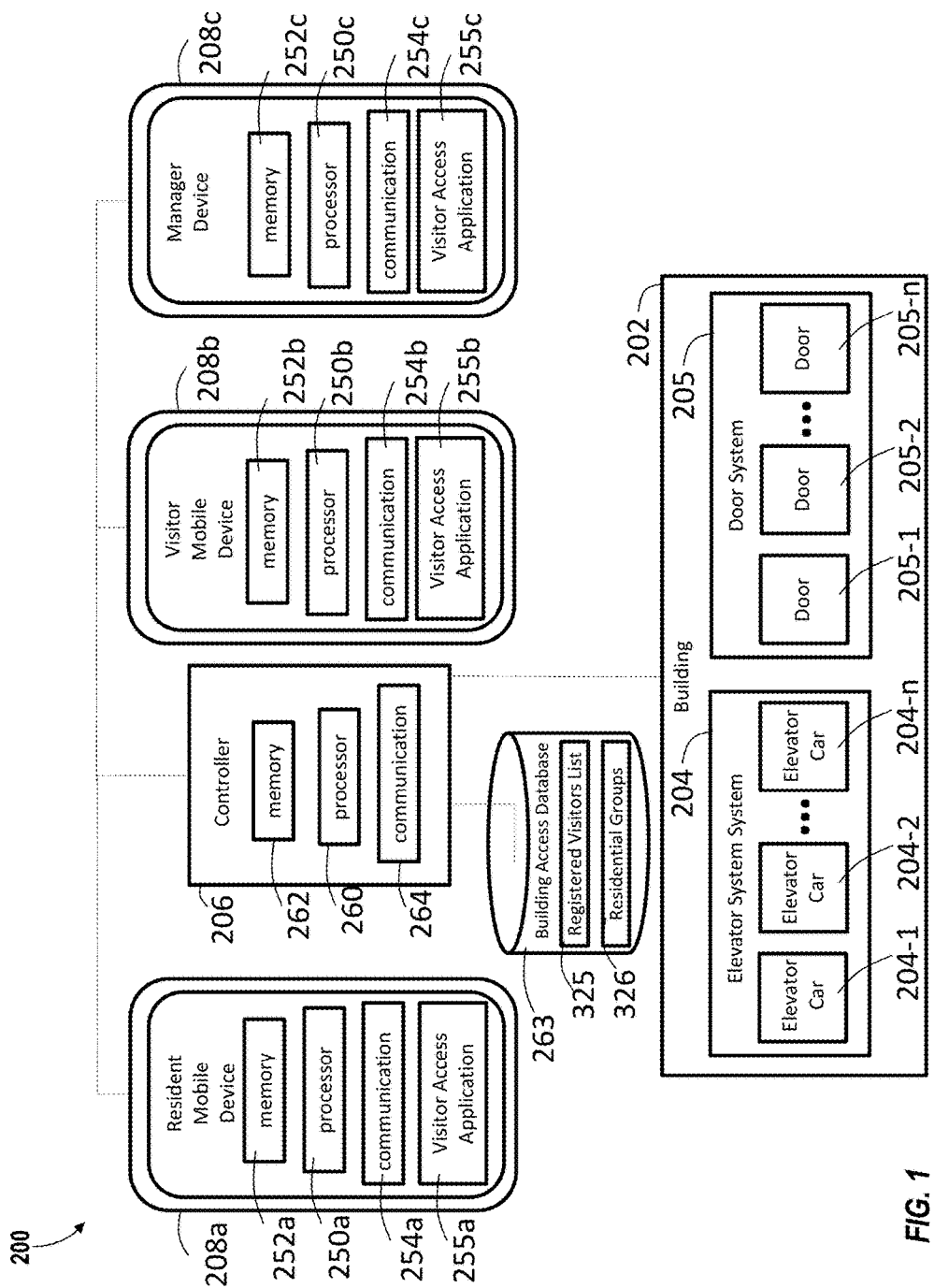
FIG. 1 illustrates a schematic view of a building access system, in accordance with an embodiment of the disclosure.

FIG. 1 depicts a building access system 200 in an example embodiment. The building access system 200 includes a door system 205 and an elevator system 204 installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator system 204. Persons entering the building 202 may be required to enter a door (e.g., doors 205-1, 205-2 . . . 205-n) of the door system 205. The door (e.g., doors 205-1, 205-2 . . . 205-n) may include but is not limited to a door in a wall of the building, a door on the outside of the building, a garage door, a parking lot access gate, a turnstile, canal locks, or similar portal/mechanism that may lock and/or open known to one of skill in the art.

The elevator system 204 may be operably connected to one or more computing devices, such as a controller 206. The controller 206 may be configured to control dispatching operations for one or more elevator cars (e.g., elevator cars 204-1, 204-2 . . . 204-n) associated with the elevator system 204. The controller 206 may also be configured to control access to the one or more elevator cars (e.g., elevator cars 204-1, 204-2 . . . 204-n) associated with the elevator system 204. It is understood that the elevator system 204 may utilize more than one controller 206, and that each controller may control a group of elevators cars 204-1 and 204-2. Although two elevator cars 204-1 and 204-2 are shown in FIG. 1, it is understood that any number of elevators cars 204-n may be used in the elevator system 204. The elevator cars 204-1 and 204-2 may be located in the same hoistway or in different hoistways so as to allow coordination amongst elevator cars 204-1 and 204-2 in different elevator banks serving different floors. It is understood that other components of the elevator system 204 (e.g., drive, counterweight, safeties, etc.) are not depicted for ease of illustration.

Further, the controller 206 may also be configured to control access to one or more doors (e.g., doors 205-1, 205-2 . . . 205-n). It is understood that the door system 205 may utilize more than one controller 206, and that each controller may control a group of doors 205-1 and 205-2. Although two doors 205-1 and 205-2 are shown in FIG. 1, it is understood that any number of elevators cars 205-n may be used in the door system 205. It is understood that other components of the door system 205 (e.g., locks.) are not depicted for ease of illustration. Additionally, the controller 206 may be configured to control access to one or more floors through the elevator system 204 and/or door system 205.

The controller 206 may include a processor 260, memory 262, and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols as described in further detail herein.

Also shown in FIG. 1 is a resident mobile device 208a. The resident mobile device 208a may include a device that is typically carried by a person, such as a phone, PDA, smart watch, tablet, laptop, etc. The resident mobile device 208a may include a processor 250a, memory 252a and communication module 254a as shown in FIG. 1. The processor 250a can be any type or combination of computer processors, such as a microprocessor, microcontroller, digital signal processor, application specific integrated circuit, programmable logic device, and/or field programmable gate array. The memory 252a is an example of a non-transitory computer readable storage medium tangibly embodied in the resident mobile device 208a including executable instructions stored therein, for instance, as firmware. The communication module 254a may implement one or more communication protocols as described in further detail herein. The resident mobile device 208a belongs to a resident of the building 202.

Also shown in FIG. 1 is a visitor mobile device 208b. The visitor mobile device 208b may include a device that is typically carried by a person, such as a phone, PDA, smart watch, tablet, laptop, etc. The visitor mobile device 208b may include a processor 250b, memory 252b and communication module 254b as shown in FIG. 1. The processor 250b can be any type or combination of computer processors, such as a microprocessor, microcontroller, digital signal processor, application specific integrated circuit, programmable logic device, and/or field programmable gate array. The memory 252b is an example of a non-transitory computer readable storage medium tangibly embodied in the visitor mobile device 208b including executable instructions stored therein, for instance, as firmware. The communication module 254b may implement one or more communication protocols as described in further detail herein. The visitor mobile device 208b may belong to a visitor of the building 202, such as, for example, food delivery person, parcel delivery person, serve/maintenance person, baby sitter, long-term visitor, short term visitor, and reoccurring visitor.

Also shown in FIG. 1 is a manager device 208c. The manager device 208b may be a computing device such as a desktop computer. The manager device 208b may also be a mobile computing device that is typically carried by a person, such as, for example a phone, PDA, smart watch, tablet, laptop, etc. The manager device 208c may include a processor 250c, memory 252c and communication module 254c as shown in FIG. 1. The processor 250c can be any type or combination of computer processors, such as a microprocessor, microcontroller, digital signal processor, application specific integrated circuit, programmable logic device, and/or field programmable gate array. The memory 252c is an example of a non-transitory computer readable storage medium tangibly embodied in the manager device 208c including executable instructions stored therein, for instance, as firmware. The communication module 254c may implement one or more communication protocols as described in further detail herein. The manager device 208c may belong to a manager of the building 202 and have superseding authority to the resident mobile device 208a in granting and/or denying access.

The resident mobile device 208a, visitor mobile device 208b, and the manager device 208c may all be referred to as a device 208 for ease of explanation. The device 208 and the controller 206 communicate with one another. For example, the device 208 and the controller 206 may communicate with one another when proximate to one another (e.g., within a threshold distance). The device 208 and the controller 206 may communicate over a wireless network, such as 802.11x (WiFi), short-range radio (Bluetooth), cellular, satellite, etc. In some embodiments, the controller 206 may include, or be associated with (e.g., communicatively coupled to) a networked element, such as kiosk, beacon, hall call fixture, lantern, bridge, router, network node, door lock, elevator control panel, building intercom system, etc. The networked element may communicate with the device 208 using one or more communication protocols or standards. For example, the networked element may communicate with the device 208 using near field communications (NFC). In other embodiments, the controller 206 may establish communication with a device 208 that is outside of the building 202. This connection may be established with various technologies including GPS, triangulation, or signal strength detection, by way of non-limiting example. In example embodiments, the device 208 communicates with the controller 206 over multiple independent wired and/or wireless networks. Embodiments are intended to cover a wide variety of types of communication between the device 208 and controller 206, and embodiments are not limited to the examples provided in this disclosure. Communication between the device 208 and the controller 206 will allow the controller 206 to determine the location of the device 208 in relation to the elevator system 204 and/or the door system 205. Knowing the relative location of the device 208 will allow the controller 206 to determine when the device 208 is being presented at an elevator system 204 and/or a door system 205 to request access.

Embodiments generate a user interface on the device 208 through a visitor access application 255a, 255b, 255c. The visitor access application 255a may be used by residents to grant access to visitors to selected elevators cars, selected floors of the building 202, and/or selected doors of the building 202. For example, a resident using the visitor access application 255a on the resident mobile device 208a may grant access to visitor and the visitor mobile device 208b will be used as identification to open the selected elevators cars, selected floors of the building 202 and/or selected doors of the building 202. For example, a resident may grant access to a babysitter to open the front door of the building 202, take the first elevator car up to the fifth floor and then open the door of the resident. While in the building the babysitter may not have access to any other doors, elevators, or floors other than what was granted by the resident. An identification code on the visitor mobile device 208b will identify the visitor through communication with the controller 206 at each selected elevators car, selected floor, and selected door. The identification code may include but is not limited to a generated code, a biometric, or a unique electromagnetic signature.

In a non-limiting example, in order to obtain/activate the identification code, the resident may submit their visitor's information to the visitor access application 255a, which generates an access profile for the visitor similar to what was created for the resident by a building manager. The visitor may receive an email invite to download the visitor access application 255a, after which they will install, validate their use by creating an visitor access application 255a account using a provided code, and registering for the building 202 using the same email. Through this validated email and visitor access application 255a on their phone (validated by the code), the building access system 200 recognizes the visitor as a valid user for the purpose of secured access at various locations of the building 202. Once the visitor is registered, an identification code of the visitor mobile device 208b is added to the registered visitors list within a building access database 263. The building access database 263 may be operatively connected to the controller 206 or stored within the controller 206. In one embodiment, the building access database 263 may be stored offsite, remotely, or in the cloud. When a visitor is registered, a residential group 326 is associated with the visitor. The residential group 326 may also be stored in the building access database 263. The residential group 326 is a group of residents who may each grant or deny access to the visitor to at least one of a selected door, a selected floor, and a selected elevator. The residential groups 326 may be assigned to the visitor automatically by the controller 206 or manually assigned to the visitor by a resident or visitor.

Figure 2:
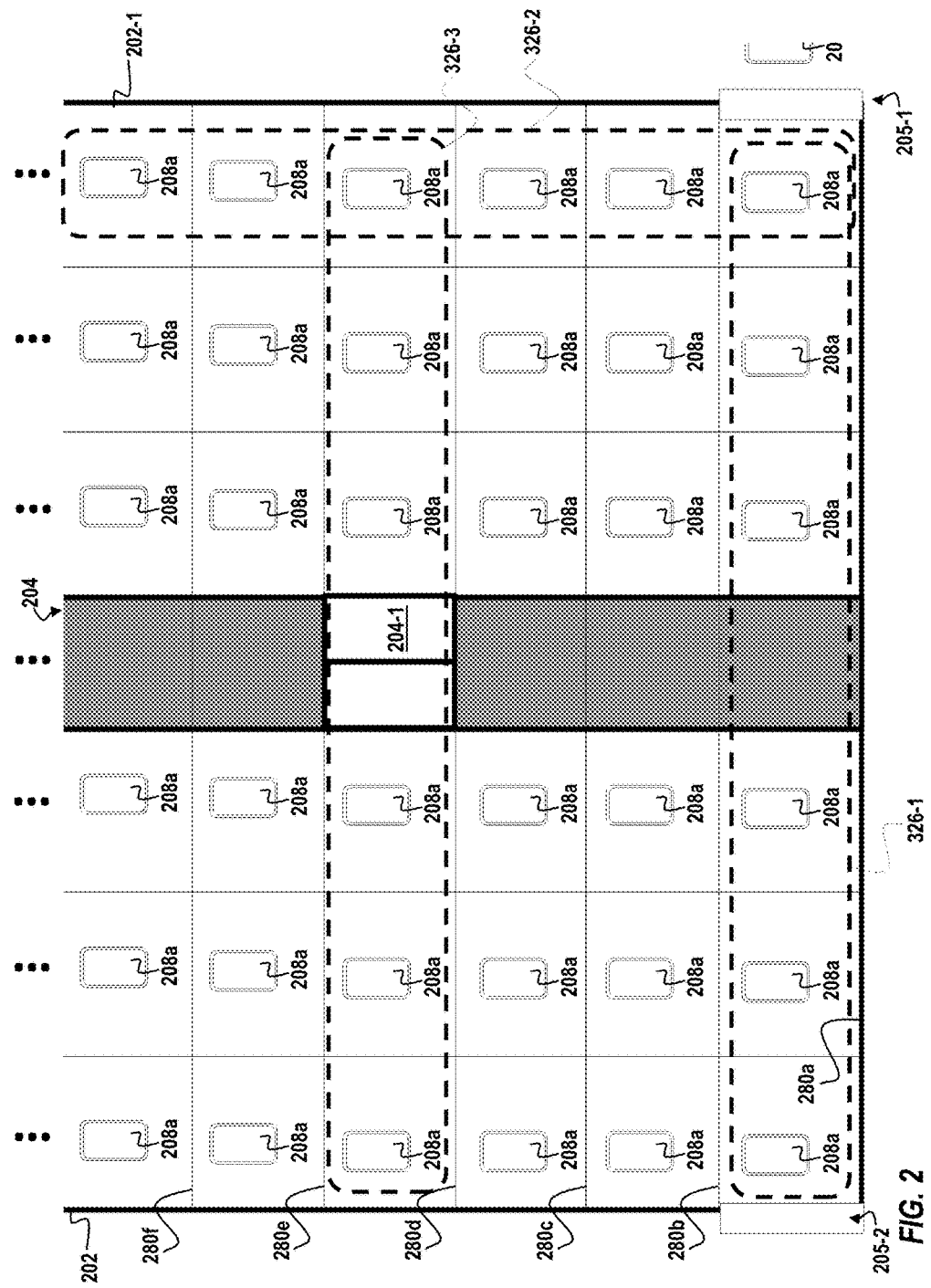
FIG. 2 depicts residential grouping for use in the building access system of FIG. 1, in accordance with an embodiment of the disclosure.

FIG. 2 depicts examples of potential residential groups 326 including residential groups 326-1, 326-2, 326-3. Referring to FIG. 2, when a visitor shows up to a building 202 with the visitor mobile device 208b an alert may be sent out to a residential group 326 requesting access to the building 202. Any member of the residential group 326 may grant the visitor access to the building 202. Access may be granted to the entire building 202 and/or access may be granted to a selected door (e.g., 205-1, 205-2), selected elevator (e.g., 204-1), and selected building floor (e.g., 208a-208f). The residential groups 326 may be may be organized in a variety of ways. In one example, if the visitor needs access to the door 205-1 on the first floor 280a, a notification may be sent out to all residents on the first floor 280a in residential group 326-1 as shown in FIG. 2. In a second example, if the visitor is fixing windows on one side 202-1 of the building 202 then a notification may be sent out to all residents on the that side 202-1 of the building in residential group 326-2 as shown in FIG. 2. In a third example, if the visitor is fixing items on fourth floor 280*d* of the building 202 then a notification may be sent out to all residents on the fourth floor 280*d* of the building in residential group 326-3 as shown in FIG. 2. In a fourth example not shown in FIG. 2, a notification may be sent out to members of a group 326 who are currently present in the building 202 when the visitor has arrived at the building 202. The residential groups 326 may be created manually by a resident of the building on a resident mobile device 208*a*, manually by a visitor of the on a visitor mobile device 208*b*, manually by a manager on a manager device 208*c*, or automatically by the controller 206. The controller 206 may automatically create a residential group 326 in response a location of the resident mobile device 208*c*. The location may be a current location and/or a projected location at a selected time. The location may be within the building. The location may be within a selected radius of the visitor mobile device 208*b*. The location may also be within a selected radius of a selected destination of the visitor mobile device. For example, a visitor may be going to the fourth floor 280*d* to fix a light thus anyone on the fourth floor may be notified to grant access. In a non-limiting example, residential groups 326 may also include families and/or social media groups. As mentioned above, residential groups 326 may be created automatically and/or manually with or without the member's consent and members of the residential groups 326 may be able to remove themselves from the group by submitting a request.

Figure 3:
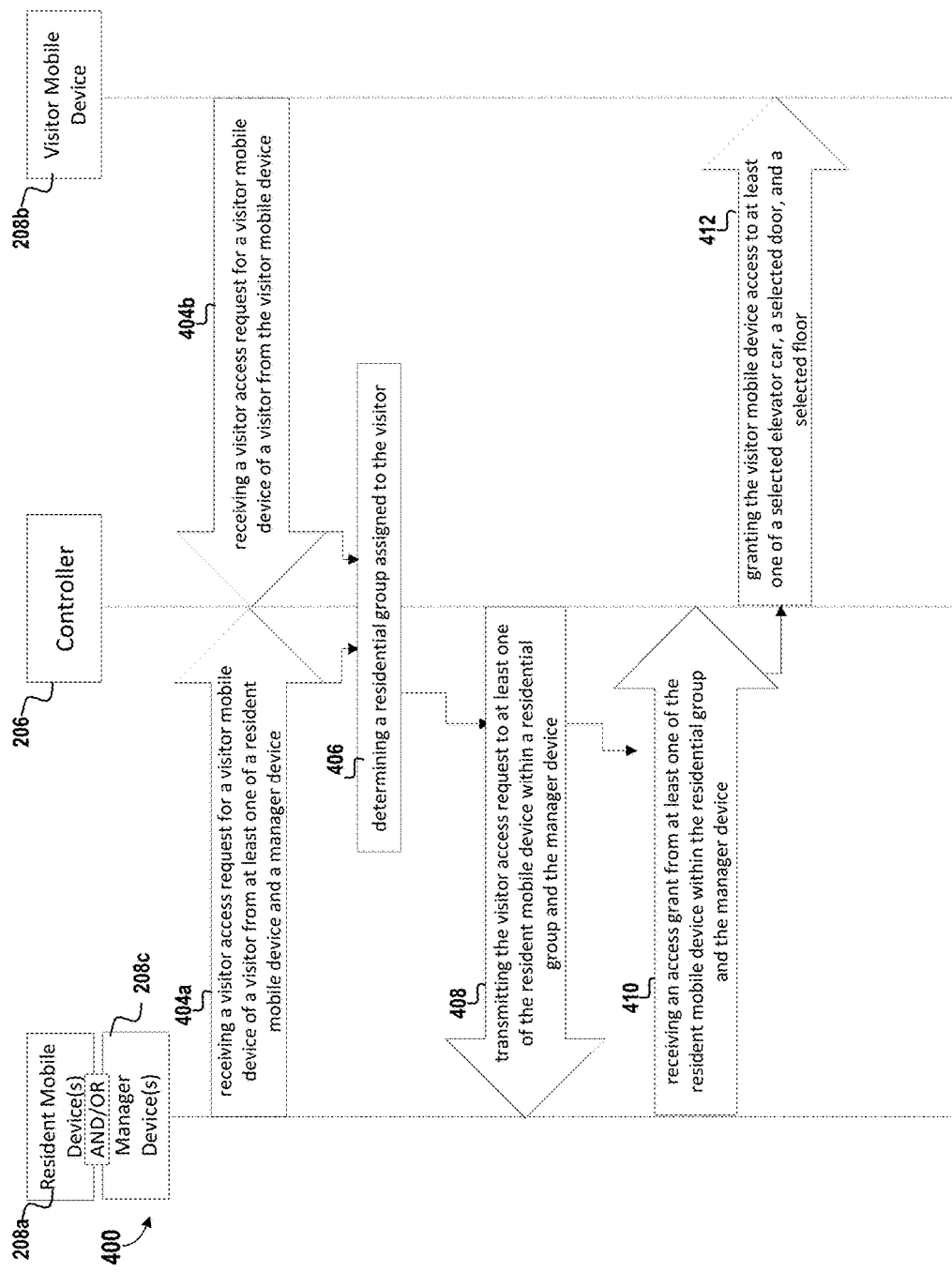
FIG. 3 is a flow diagram illustrating a method of controlling access to a building, according to an embodiment of the present disclosure.

Referring now to FIG. 3, while referencing components of FIGS. 1-2. FIG. 3 shows a flow chart of method 400 of granting access to a building 202, in accordance with an embodiment of the disclosure. At block 404*a* and 404*b*, the controller 206 receives a visitor access request for a visitor mobile device 208*b* of a visitor. As mentioned above, the visitor mobile device 208*b* contains an identification code to identify the visitor device 208 as belonging to the visitor. The visitor access request may be sent from at least one of a resident mobile device 208*a* and a manager device 208*c*, as in block 404*a*. The visitor access request may be sent from a visitor mobile device 208*b* as in block 404*b*.

At block 406, a residential group 326 assigned to the visitor is determined. The residential group 326 may be automatically assigned to the visitor by the controller 206. The residential group 326 may be selected by the resident when the visitor access request is sent from a resident mobile device 208*a* in block 404*a*. Also, the residential group 326 may be selected by the visitor when the visitor access request is sent from the visitor mobile device 208*b* in block 404*b*.

At block 408, the visitor access request is transmitted to at least one of the resident mobile device 208*a* within the residential group 326 and the manager device 208*c*. In an embodiment, the visitor access request is transmitted only to resident mobile devices 208*a* located in the building 202. In another embodiment, the visitor access request may transmit when the visitor arrives at the building 202. In an embodiment, the control system 206 detects when the visitor mobile device 208*b* is located proximate to at least one of a selected elevator car, a selected door, and a selected floor. In another embodiment, the visitor access request is transmitted to at least one resident mobile device 208*a* within the residential group 326 when the visitor mobile device 208*b* is located proximate at least one of a selected elevator car, a selected door, and a selected floor. The manager with the manager device 208*c* has supervisory control over the resident mobile device 208*a* and may deny or grant access approval to the visitor mobile device 208*b*, which is then sent to the controller 206. The manager may also form or disband residential groups 326. A decision of the manager sent from the manager device 208*c* overrides any grant of access and/or group decision from a resident mobile device 208*a*.

At block 410, the controller 206 receives an access grant from at least one of the resident mobile device 408*a* within the residential group 326 and the manager device 208*c*. At block 412, the visitor mobile device 208*b* is granted access to at least one of a selected elevator car, a selected door, and a selected floor. Access may be granted for a specific time including at least one of a selected period of time, a selected date, and a reoccurring schedule. Once access is granted, a notification may be sent to the visitor mobile device 208*b*. The notification may indicate that access has been granted to the visitor to at least one of a selected door, a selected elevator car, and a selected floor. Once access is granted, the visitor will now be able to use the visitor mobile device 208*b* to access at least one of the selected elevator car, the selected door, and the selected floor. In one example, a selected door will unlock when the visitor mobile device 208*b* is presented to the selected door once access has been granted. In a second example, a selected elevator car will open when the visitor mobile device 208*b* is presented to the selected elevator car once access has been granted. In a third example, the selected elevator car will move to the selected floor when the visitor mobile device 208*b* is presented to the selected elevator car once access has been granted.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling access to a building, the method comprising:
   receiving a visitor access request for a visitor mobile device;
   automatically creating a residential group in response to a location of each of the plurality of resident mobile devices, the residential group including a plurality of residential mobile devices;
   transmitting the visitor access request to at least one of the plurality of resident mobile devices within the residential group and a manager device;
   receiving an access grant from at least one of the plurality of resident mobile devices within the residential group and the manager device; and
   granting a visitor mobile device access to at least one of a selected elevator car, a selected door, and a selected floor.

2. The method of claim 1, wherein:
   the visitor request is transmitted to the plurality of resident mobile devices; and
   the access grant is received from at least one of the plurality of resident mobile devices.

3. The method of claim 2, further comprising prior to granting:
   transmitting the visitor access request to the manager device; and
   receiving an access approval from the manager device.

4. The method of claim 1, wherein:
   the residential group is limited to resident mobile devices of the plurality of resident mobile devices currently located within the building.

5. The method of claim 4, wherein:
   the visitor access request is transmitted only to resident mobile devices of the plurality of resident mobile devices located in the building.

6. The method of claim 1, wherein:
   the location is a projected location at a selected time.

7. The method of claim 1, wherein:
   the location is within a selected radius of the visitor mobile device.

8. The method of claim 1, wherein:
   the location is within a selected radius of a selected destination of the visitor mobile device.

9. The method of claim 1, wherein:
   the visitor request is received from at least one of the plurality of resident mobile devices and the visitor mobile device.

10. The method of claim 1, further comprising:
    detecting when the visitor mobile device is located proximate to at least one of a selected elevator car, a selected door, and a selected floor.

11. The method of claim 10, further comprising:
    transmitting the visitor access request to the plurality of resident mobile devices within the residential group when the visitor mobile device is located proximate at least one of a selected elevator car, a selected door, and a selected floor.

12. The method of claim 10, wherein the granting further comprises:
    unlocking the selected door when the visitor mobile device is presented to the selected door.

13. The method of claim 10, wherein the granting further comprises:
    opening the selected elevator car when the visitor mobile device is presented to the selected elevator car.

14. The method of claim 10, wherein the granting further comprises:
    moving the selected elevator car to the selected floor when the visitor mobile device is presented to the selected elevator car.

15. The method of claim 1, further comprising:
    transmitting a notification to the visitor mobile device when access is granted.

16. The method of claim 1, further comprising:
    transmitting the visitor access request to the manager device;
    receiving an access denial from the manager device; and
    denying the visitor mobile device access to at least one of a selected elevator car, a selected door, and a selected floor;
    wherein denying access overrides any granting access to a selected elevator car, a selected door, and a selected floor.

17. A building access system comprising:
    a processor;
    a memory comprising computer-executable instructions that, when executed by the processor, cause the processor to perform operations, the operations comprising:
    receiving a visitor access request for a visitor mobile device;
    automatically creating a residential group in response to a location of each of the plurality of resident mobile devices, the residential group including a plurality of residential mobile devices;
    transmitting the visitor access request to at least one of the plurality of resident mobile devices within the residential group and a manager device;
    receiving an access grant from at least one of the plurality of resident mobile devices within the residential group and the manager device; and
    granting a visitor mobile device access to at least one of a selected elevator car, a selected door, and a selected floor.

18. A non-transitory computer readable medium including a computer program, the computer program including instructions that, when executed by a processor, cause the processor to perform operations comprising: receiving a visitor access request for a visitor mobile device; automatically creating a residential group in response to a location of each of the plurality of resident mobile device, the residential group including a plurality of residential mobile devices; transmitting the visitor access request to at least one of the plurality of resident mobile devices within the residential group and a manager device; receiving an access grant from at least one of the plurality of resident mobile devices within the residential group and the manager device; and granting a visitor mobile device access to at least one of a selected elevator car, a selected door, and a selected floor.

* * * * *